(12) United States Patent
Dawson et al.

(10) Patent No.: US 10,896,130 B2
(45) Date of Patent: Jan. 19, 2021

(54) RESPONSE TIMES IN ASYNCHRONOUS I/O-BASED SOFTWARE USING THREAD PAIRING AND CO-EXECUTION

(71) Applicant: INTERNATIONAL BUSINESS MACHINES CORPORATION, Armonk, NY (US)

(72) Inventors: Michael H. Dawson, Ottawa (CA); Gireesh Punathil, Kannur (IN)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 15/297,312

(22) Filed: Oct. 19, 2016

(65) Prior Publication Data

US 2018/0107600 A1   Apr. 19, 2018

(51) Int. Cl.
*G06F 12/0862* (2016.01)
*G06F 13/366* (2006.01)
(Continued)

(52) U.S. Cl.
CPC .......... *G06F 12/0862* (2013.01); *G06F 9/383* (2013.01); *G06F 9/3808* (2013.01);
(Continued)

(58) Field of Classification Search
CPC .. G06F 12/0862; G06F 9/3802; G06F 9/3804; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698; G06F 2009/3883; G06F 2009/45562–45595; G06F 2015/761–768; G06F 2201/00–885; G06F 2206/00–20;
(Continued)

(56) References Cited

U.S. PATENT DOCUMENTS 5,596,740 A * 1/1997 Quattromani ....... G06F 13/1647
                                                365/189.02
5,742,184 A * 4/1998 Martinez, Jr. ..............................
                                                H03K 19/018521
                                                326/34
(Continued)

OTHER PUBLICATIONS

R. H. Mameesh and M. Franklin, "Speculative-Aware Execution: A simple and efficient technique for utilizing multi-cores to improve single-thread performance," 2010 19th International Conference on Parallel Architectures and Compilation Techniques (PACT), Vienna, 2010, pp. 421-430. (Year: 2010).*

(Continued)

*Primary Examiner* — Daniel C. Chappell
(74) *Attorney, Agent, or Firm* — Tutunjian & Bitetto, P.C.; Scott Dobson

(57) ABSTRACT

Methods and systems for pre-fetching operations include executing event callbacks in an event loop using a processor until execution stops on a polling request. A path walk is performed on future events in the event loop until the polling request returns to pre-fetch information for the future events into a processor cache associated with the processor. Execution of the event callbacks in the event loop is resumed after the polling request returns.

20 Claims, 5 Drawing Sheets

(51) Int. Cl.
*G06F 12/0875* (2016.01)
*G06F 9/38* (2018.01)
*G06F 9/52* (2006.01)

(52) U.S. Cl.
CPC ............ *G06F 9/52* (2013.01); *G06F 12/0875* (2013.01); *G06F 13/366* (2013.01); *G06F 2212/1024* (2013.01); *G06F 2212/452* (2013.01); *G06F 2212/502* (2013.01); *G06F 2212/6028* (2013.01); *Y02D 10/00* (2018.01)

(58) Field of Classification Search
CPC ........ G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | |
|---|---|---|---|---|
| 5,784,589 A * | 7/1998 | Bluhm | ................ | G06F 9/30043 712/217 |
| 6,308,261 B1 * | 10/2001 | Morris | ................ | G06F 9/30047 712/217 |
| 6,681,318 B2 * | 1/2004 | Chaudhry | ............. | G06F 9/3802 711/130 |
| 7,343,602 B2 | 3/2008 | Luk et al. | | |
| 7,434,004 B1 | 10/2008 | Spracklen et al. | | |
| 8,151,075 B2 * | 4/2012 | Strauss | ............... | G06F 12/0215 711/169 |
| 8,359,589 B2 | 1/2013 | Arimilli et al. | | |
| 8,694,759 B2 * | 4/2014 | Dundas | ................... | G06F 9/322 712/237 |
| 8,719,806 B2 | 5/2014 | Wang et al. | | |
| 9,086,721 B2 * | 7/2015 | Jackson | ............. | G06F 9/30003 |
| 9,292,446 B2 * | 3/2016 | Raman | ................ | G06F 12/0862 |
| 9,792,123 B2 * | 10/2017 | Manoukian | ......... | G06F 9/30061 |
| 10,318,172 B2 * | 6/2019 | Day | ...................... | G06F 3/0638 |
| 10,318,304 B2 * | 6/2019 | Manoukian | ........... | G06F 9/3848 |
| 10,642,744 B2 * | 5/2020 | Boggs | ................. | G06F 12/0875 |
| 2004/0117606 A1 * | 6/2004 | Wang | ..................... | G06F 9/383 712/235 |
| 2007/0022412 A1 | 1/2007 | Tirumalai et al. | | |
| 2011/0173419 A1 * | 7/2011 | Arimilli | ................ | G06F 9/3802 712/220 |
| 2012/0054449 A1 * | 3/2012 | Hu | ...................... | G06F 12/0862 711/137 |
| 2014/0365753 A1 * | 12/2014 | Hooker | ............... | G06F 9/30058 712/239 |

OTHER PUBLICATIONS

Fay Chang et al., Automatic I/O Hint Generation Through Speculative Execution, Proceedings of the 3rd Symposium on Operating Systems Design and Implementation, New Orleans, Louisiana, Feb. 1999.

Gaurav Chadha et al., EFetch: Optimizing Instruction Fetch for Event-Driven Web Applications, PACT'14, Edmonton, AB, Canada, Aug. 24-27, 2014.

Jaejin Lee et al., Prefetching with Helper Threads for Loosely Coupled Multiprocessor Systems, IEEE Transactions on Parallel and Distributed Systems, vol. 20, No. 9, pp. 1309-1324, Sep. 2009.

\* cited by examiner

US 10,896,130 B2

RESPONSE TIMES IN ASYNCHRONOUS I/O-BASED SOFTWARE USING THREAD PAIRING AND CO-EXECUTION

BACKGROUND

Technical Field

The present invention generally relates to pre-fetching data to a cache and, more particularly, to pre-fetching data while a thread waits for an event.

Description of the Related Art

Performance in modern processing systems is highly dependent on the degree to which instructions and data are stored in caches closest to the processor when they are needed. If an instruction or data is forced out of the cache, for example through normal program execution, then processing may stall while waiting for that information to be called up from storage devices that are significantly slower than the cache.

SUMMARY

A method for pre-fetching operations includes executing event callbacks in an event loop using a processor until execution stops on a polling request. A path walk is performed on future events in the event loop until the polling request returns to pre-fetch information for the future events into a processor cache associated with the processor. Execution of the event callbacks in the event loop is resumed after the polling request returns.

A system for pre-fetching operations includes a processor configured to execute event callbacks in an event loop until execution stops on a polling request, to perform a path walk on future events in the event loop until the polling request returns to pre-fetch information for the future events into a processor cache associated with the processor, and to resume execution of the event callbacks in the event loop after the polling request returns.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention pre-fetch data for a main processing thread while the main processing thread waits for input/output (I/O) operations to resolve. These are periods of time in which a thread has to wait for a particular piece of information. In a simultaneous multithreading (SMT) system, when one thread is stopped for any reason, other threads can use the same processor to execute operations. The present embodiments take advantage of this to execute operations on the same processor as a main thread based on upcoming events in the main thread's event loop, thereby ensuring that the pertinent data for those operations is stored in the cache when the main thread gets to them.

Figure 1:
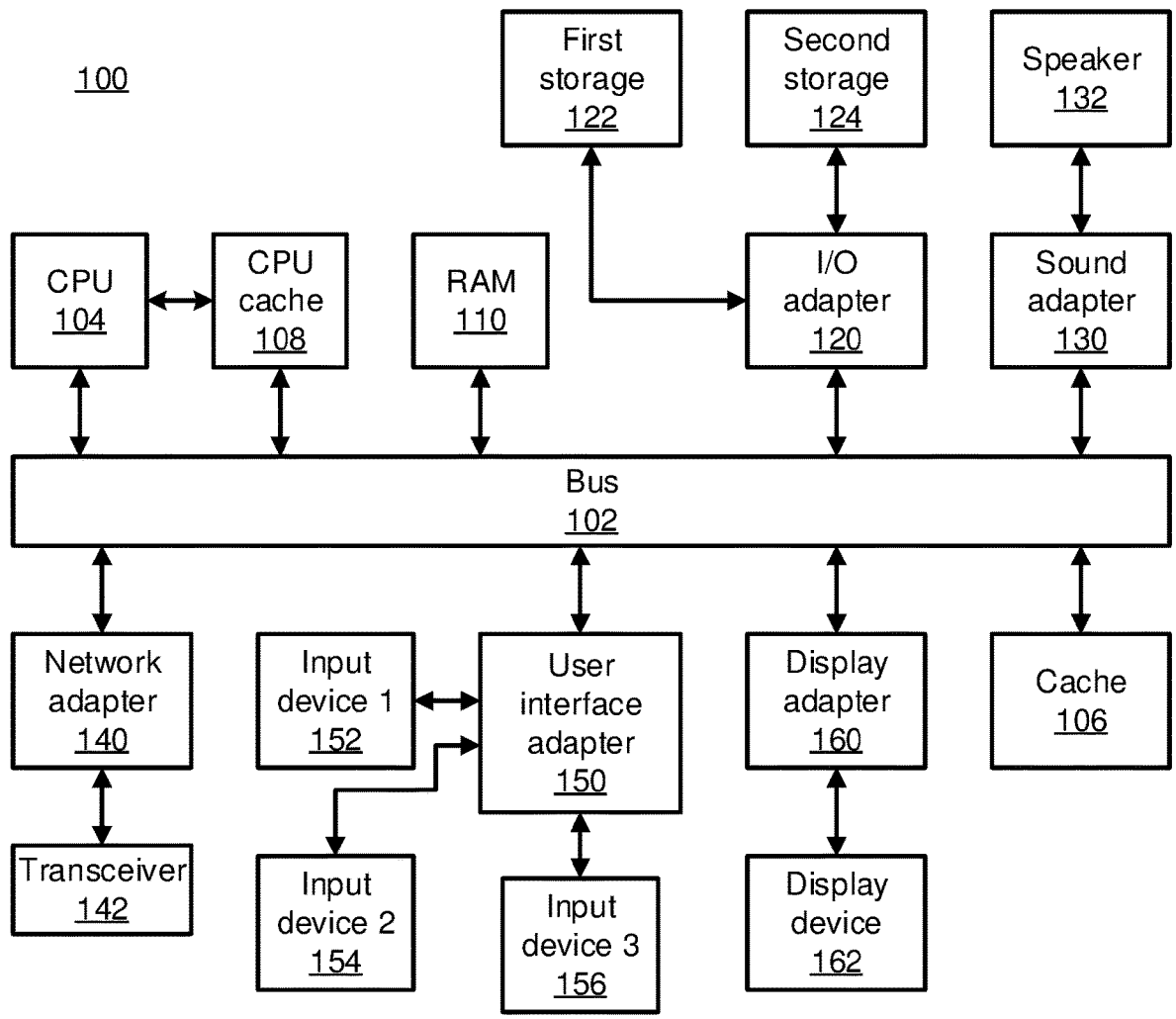
FIG. 1 is a block diagram of a processing system in accordance with the present embodiments.

Referring now to FIG. 1, an exemplary processing system 100 is shown. The processing system 100 includes at least one processor (CPU) 104 operatively coupled to other components via a system bus 102. A CPU cache 108 is in direct communication with the CPU 104. A cache 106, a Random Access Memory (RAM) 110, an input/output (I/O) adapter 120, a sound adapter 130, a network adapter 140, a user interface adapter 150, and a display adapter 160, are operatively coupled to the system bus 102.

It should be noted that multiple CPUs 104 with respective CPU caches 108 may furthermore be employed. It is specifically contemplated that the CPU may be capable of SMT, though embodiments are contemplated without SMT. SMT permits multiple independent execution threads to run in CPU 104 simultaneously to share some of the CPU resources (e.g., cache, execution unit, branch prediction circuitry, etc.) while isolating business data (e.g., code and data—registers, memory, etc.) between them. When SMT is used, more than one thread is allowed to execute independent instruction sequences in each CPU 104, without intervention of the host operating system (whereas traditionally thread switching is an operating system's role). When one thread causes the CPU 104 to stall, for example due to latency in fetching data which is not available in the CPU cache 108, the SMT architecture allows the execution context of the stalled thread to be saved and another thread to use the CPU's resources for running its instructions.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

In one embodiment, a process runs on the CPU 104 with an asynchronous I/O channel. A peer thread may be used to help pre-fetch information to the CPU cache 108 (or any other cache, memory, or storage) to maximize the likelihood that a main thread will find the information it needs readily available. In some cases the main thread may have to wait for I/O events. During this time, the peer thread takes advantage of the multithreading capabilities of the CPU 104 to act, processing events in the main thread's event loop.

This works due to the fact that future actions of the main thread are registered as operations in the main thread's event loop. This event loop is accessible to the peer thread, which can then prioritize events as needed and pre-fetch any instructions that are likely to be used by the main thread.

The use of a peer thread represents only one embodiment of the present principles. In a second embodiment, only the main thread is used. The main thread then performs time multiplexing to split the time in which it waits for I/O events between polling and pre-fetching actions. This embodiment is particularly useful in systems where the CPU 104 is not capable of SMT. In both embodiments, the processes take advantage of the main thread's downtime while waiting for I/O events to improve future performance.

In one specific embodiment, a process may be implemented using an event-driven, non-blocking I/O model for implementing a request-response engine (e.g., a web server) which is single threaded by design. Such a process may use an asynchronous call-back approach to processing events. In a client-server topology, a large amount of time is spent in I/O-bound operations relative to CPU-bound operations. Thus, even registering, firing, and processing the I/O-bound operations as and when they occur, the bulk of the process's execution time will be spent in a waiting state. Pre-fetching can therefore be accomplished in this waiting time through, e.g., thread co-execution or through time multiplexing.

One side effect of SMT is that the load/store operations performed, and thereby cache modifications, by one thread at a CPU 104 are visible and in effect for other threads running at the same CPU 104. While the conventional purpose of SMT is to improve the overall CPU utilization per unit of time or per clock cycle, the present embodiments improve performance of, e.g., a server thread. The peer thread thereby proactively identifies and prepares for the future operations of the main thread. Toward this end, the peer thread looks at the instruction pointer of the main thread, identifies control flow paths, and references the address operands in the memory operations in the control flow paths for the purpose of bringing them into the CPU cache 108.

To accomplish this, multi-thread embodiments ensure that the peer thread executes on the same CPU 104 as the main thread. Some systems implement methods that can bind a thread to a specific CPU 104 where the main event processing thread is running. In embodiments where the main thread is attached to a particular CPU 104, the peer thread can also be attached to the same CPU 104. In embodiments where the main thread is not attached to a specific CPU 104, the CPU 104 on which it is running can be determined and the peer thread can be attached to that CPU 104, at the front edge of an event loop logic. In this manner the present embodiments can be employed on systems where thread-CPU affinity changes at runtime, between context switches.

Figure 2:
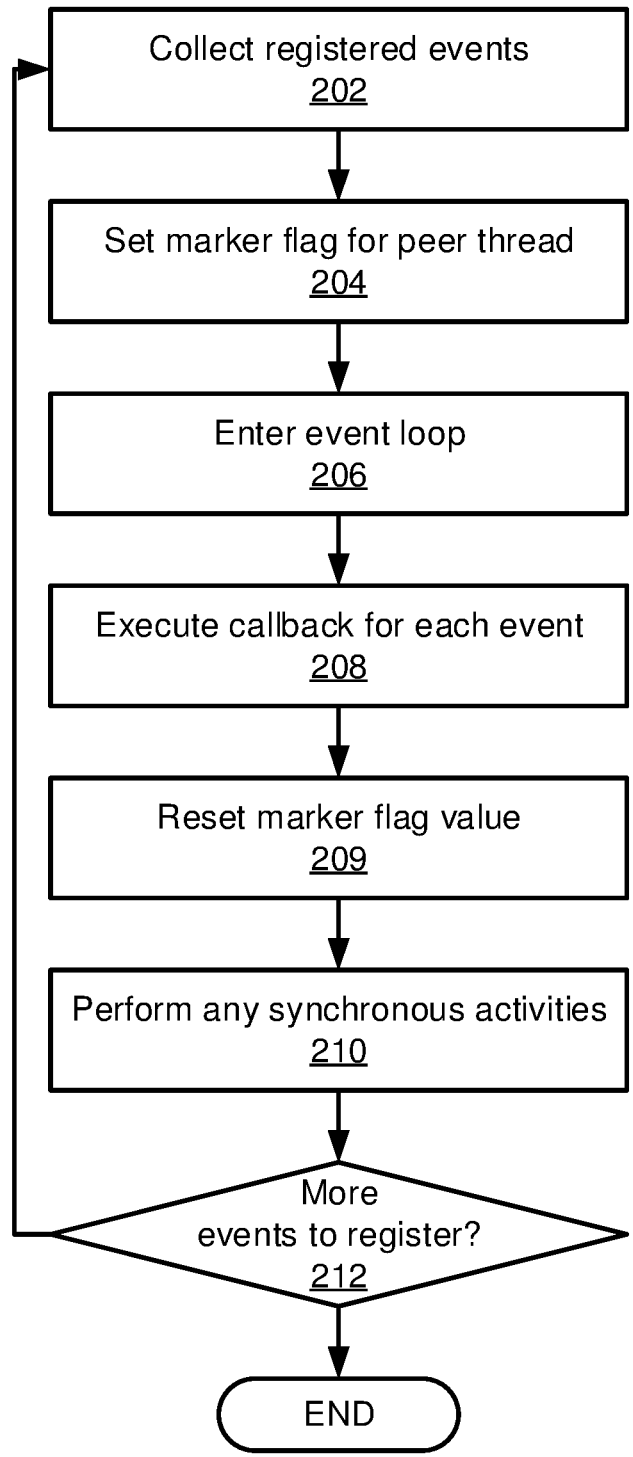
FIG. 2 is a block/flow diagram of a method for executing events in a main thread in accordance with the present embodiments.

Referring now to FIG. 2, a process flow for a main thread is shown for embodiments with a helper thread. The main thread collects current registered asynchronous events and their callbacks in block 202. Block 204 sets a marker flag for the peer thread. The marker flag is initialized to zero at startup and is incremented at the front end of the event loop. The event loop begins at block 206 and the main thread executes the callback for each event in the loop at block 208. The event loop has, at its core, a data structure that includes a list of operations (events) and callback routines to which those events are bound. In addition to providing a list for the main thread's execution, the event loop can also be traversed by the peer thread to obtain information about the main thread's likely future behavior and to obtain code entry points for the events.

The marker flag is then set to zero and its old value is cached in a temporary variable at the end of the event loop in block 209. The marker flag's value is reinstated at the beginning of the loop in block 204 when the loop begins again.

The marker flag value is used to communicate between the main thread and the peer thread. When the peer thread starts its execution, the thread waits on the condition of the marker flag to become non-zero. At this point, the peer thread caches the value of the marker flag and starts performing code-walking and data-walking. After iterating through those steps, the peer thread checks the value of the marker flag in the main thread and compares it with the cached value. This will be explained in greater detail below.

Block 210 performs any synchronous activities in the main thread. Block 212 determines whether there are any more events to register. If so, processing returns to block 202. If not, processing in the main thread ends.

When block 206 enters the event loop, an array I is populated with the events, each entry in the array being a structure that includes an event descriptor and a counter denoting the event registration. Whenever an event's polling is completed, another array O, having identical elements to I, is populated with the output. An integer F is also modified, having a value that corresponds to the number of events occurring in a given amount of time. The event loop routine maintains a loop timer, and number of events fired in the given amount of time is calculated using the timer value. In particular, $$F = Fn + \frac{C}{n+1},$$

where n is the total count of loop entrances and C is the count of entries returned in the current poll.

Before event polling is entered, an array of integers R is populated by processing I, O, and F. A sorted list of elements with high count of occurrence relative to registration count is built by iterating through I and O. This list is used to prioritize the selection of events by the peer thread.

It is contemplated that the callbacks may include one or more of low-level callbacks, for example in the libraries surrounding event descriptors, wrapper callbacks in the node runtime which manages the internal data structures, and user-defined callbacks in the application. Callbacks are always associated with a context in which they are invoked—in most common cases they are closure contexts. In common use cases, these callbacks access a number of objects other than the data in question itself.

Callbacks can be classified into read-callbacks and write-callbacks. In read-callbacks, there is a rare scenario where the readable stream is directly piped into a writeable stream, where the whole activity pertinent to the asynchronous read evolves around relaying the data to a writeable stream. Even in this case, the callback will have access to a number of contextual objects. In the case of write-callbacks, everything the callback accesses is the contextual objects (e.g., receiver objects, parameters, etc.) and the scalar data pertinent to the I/O data.

Figure 3:
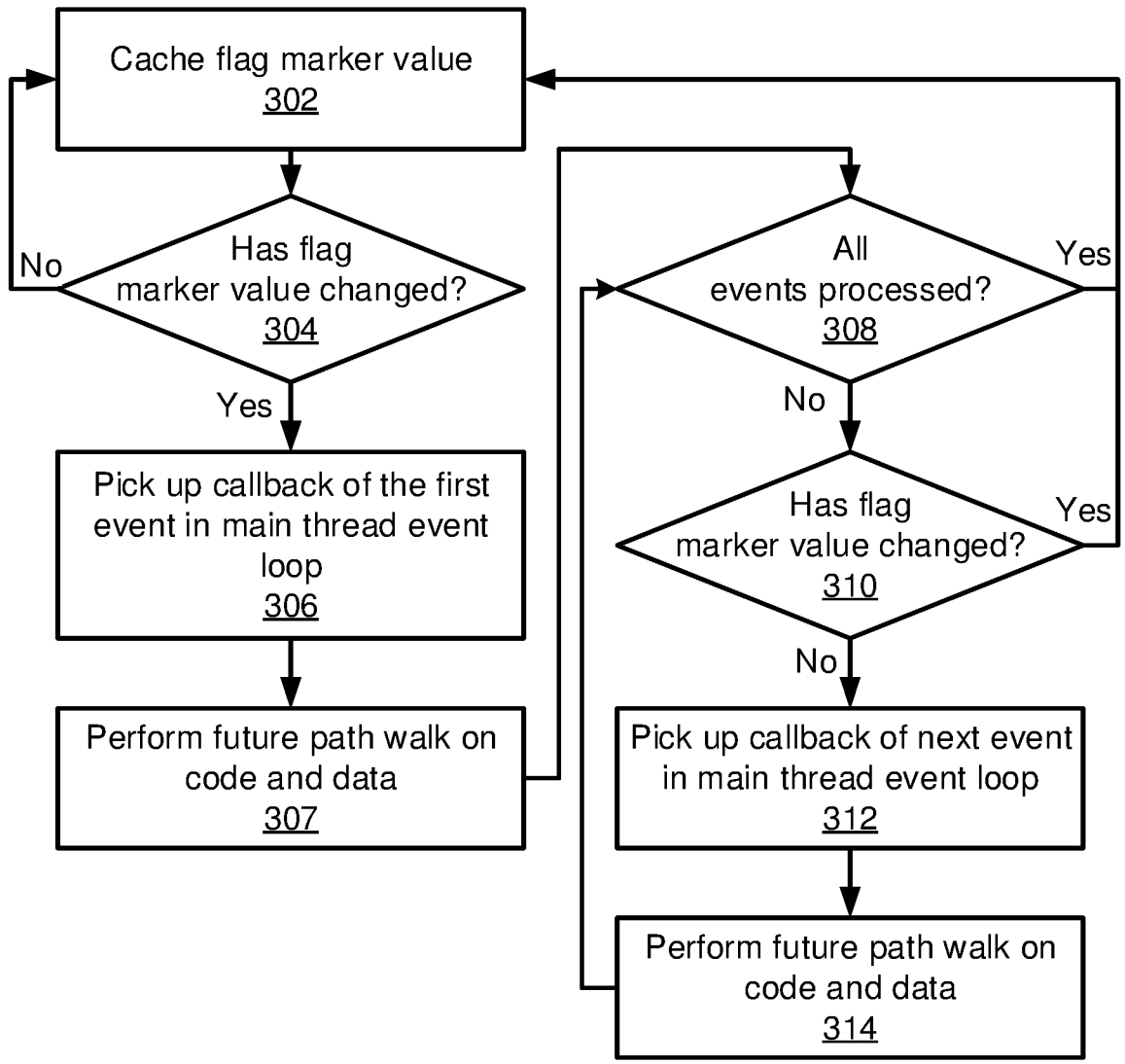
FIG. 3 is a block/flow diagram of a method for pre-fetching instructions in a peer thread in accordance with the present embodiments.

Referring now to FIG. 3, a process flow for a peer thread is shown for embodiments with a helper thread. Block 302 caches the value of the flag marker from the main thread, discussed above and block 304 determines whether the flag marker value has changed. Once the value changes, block 306 picks up the callback of the first event in the main thread event loop and block 307 performs a future path walk on the code or data associated with that event.

In one embodiment, block 307 retrieves an event handler routine and descends into the code of the routine, running through all of the memory operations in all of the control flow paths. This operation is repeated for all of the calls coming from the routine and completes once all of the routines are iterated through. In another embodiment, block 307 retrieves the event handler routine, its context object, and a receiver object and descends into the object layout of each, running through all of the fields of all of the objects in the object graph. This operation is repeated for all of the objects accessible by the routine and ends once all of the objects have been iterated through.

Block 308 determines whether all of the events in the main thread event loop have been processed and block 310 determines whether the main thread's flag marker value has changed. If either block 308 or block 310 answers "Yes," then processing returns to block 302. If not, block 312 picks up the callback of the next event in the main thread event loop and block 314 performs a future path walk.

It should be understood that the future path walk incurs some redundancy. In particular, only a subset of the events in the main thread's event loop would have happened in the current cycle. However, because there is no way to know for certain what events would be ready, one embodiment walks all possible future paths. In another embodiment, to reduce wasted processing power, historical information captured through event registration and event occurrence and event frequency counters is used to predict the most likely events. This may be accomplished, as described above, using the array R. The future path walks may then be confined to only a subset of the events waiting in the main thread's event loop, for example considering only those threads having a likelihood above some threshold value. The number of events may be the top F elements.

In another embodiment, events may be further prioritized using event types and their attributes. For example, timers can be selected or ignored based on their timeout value and events for file writes and for HTTP responses could be prioritized as they are expected to complete soon after being issued.

In addition, the future path walk may incur approximations. For example, for an event callback routine and its pertinent receiver object, it may not be possible to walk exactly the same code flow path with exactly the same set of objects as would be performed by the main thread. This is because some of the conditional branches may only be resolved when the code reaches the condition point, and similarly some of the call will be resolved only when the code reaches the call site. In addition, running code can modify object content as well as object layout, so the object graph traversal through the existing relationships may be inaccurate. However, these approximations do not cause harm or reduce the efficiency of the main thread, because at worst they will simply call up to the cache unneeded data, leaving the main thread no worse off than before the peer thread made an attempt to pre-fetch.

As noted above, the peer thread accesses the flag marker value of the main thread to determine the state of the main thread. The peer thread waits for the marker flag value to become non-zero, caches the value, and then begins processing events from the main thread's event loop. At every check (e.g., block 310), the peer thread compares the cached flag marker value to the main thread's flag marker. If the two values are the same, the peer thread continues execution in its next iteration. This state indicates that the main thread is either waiting for events or has come out of its event loop but is still processing actions pertinent to its current polling. Until the main thread state changes, future path walks by the peer thread are still valid.

If the main thread's flag marker value is zero, this indicates that the main thread has completed all of its actions pertinent to the current polling and any additional future path walking by the peer thread would be invalid. No new input set has been defined yet while the flag marker value is zero, so processing returns to block 302 until the main thread resumes.

If the main thread's flag marker value is greater than the cached value, the peer thread aborts its current operation and starts working on the new set of events in the main thread event loop. This state indicates that the main thread has completed all of the actions pertinent to the current polling and has started a new polling event with a new set of input information.

Before the peer thread begins new work, it queries the thread affinity of the main thread and binds itself to the same CPU 104. If this cannot be accomplished, the operation of the peer thread is aborted and the peer thread waits for a change in the flag marker value, waiting for a new thread affinity for the main thread and an opportunity for the peer thread to attach itself to that CPU 104.

The present embodiments may employ one or more different types of future path walk in blocks 307 and 314. In a first embodiment, the peer thread walks through instructions and performs load operations of the memory operands while converting data dependent operations and store operations to NOOP (no operation) commands. In a second embodiment, the peer thread executes instructions as driven by a control flow graph with available data while using store blocker logic to inhibit store instructions from being executed. In a third embodiment, the peer thread runs through instructions as given by the control flow graph with available data and builds a trace cache of micro operations, where the trace cache is a cache of instructions that are fetched and decoded.

A data walker iterates through the data structure pertinent to the operations in question, picks up the watchers and callback handlers of the operations, obtains the receiver object of the callback handlers, walks through the scalar and non-scalar fields of the objects and de-references each of them, pushes the non-scalar fields encountered during the object walk to a stack-like data structure, and recursively walks through the pushed non-scalar fields, pushing their references onto the structure in turn. This process is similar to marking live objects in a heap to form a complete object dependency graph, with a difference being that the stack-like structure is empty at the end of the process. The data walker touches the memory to transfer information to the CPU cache 108 and does not seek to store information permanently.

Figure 4:
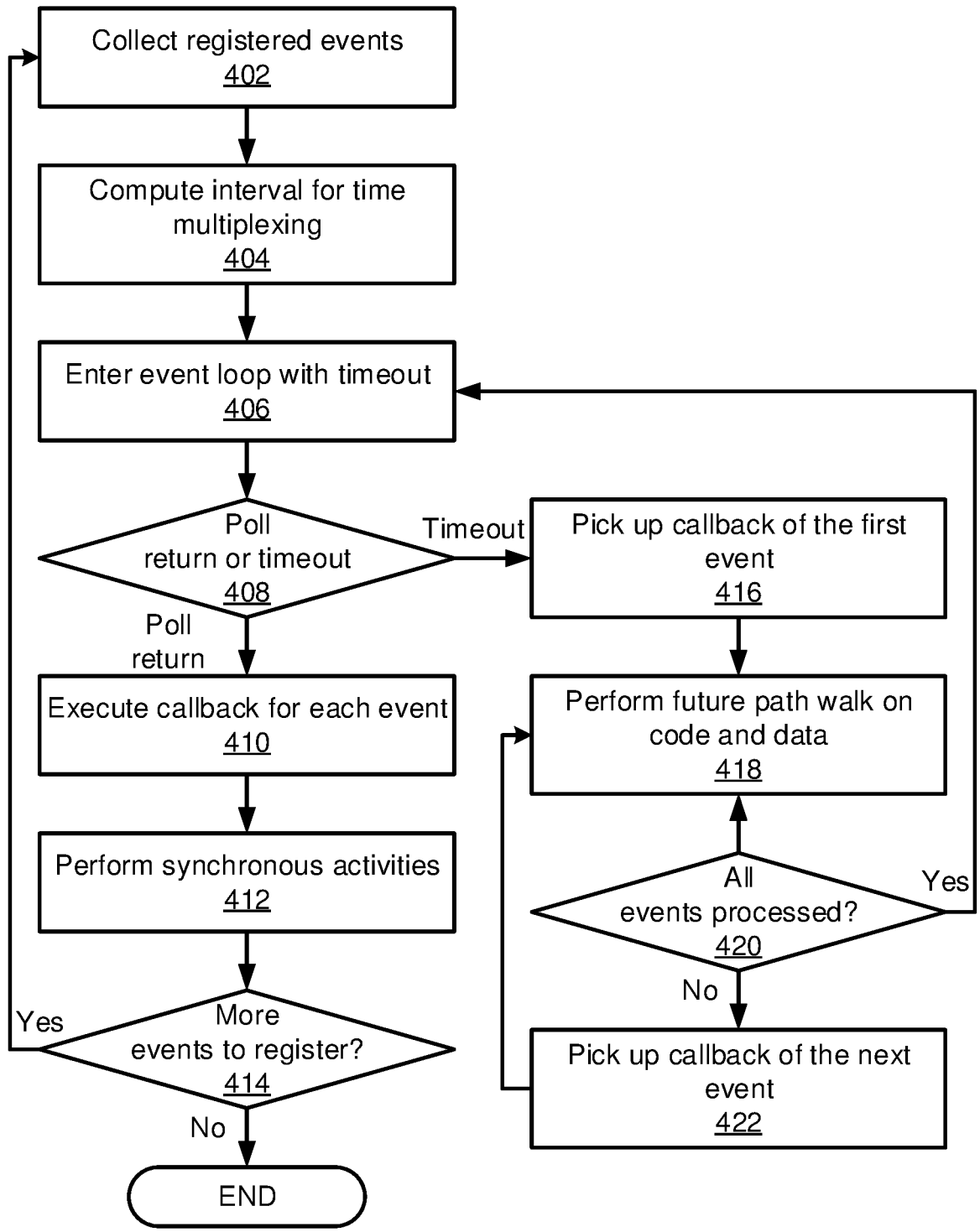
FIG. 4 is a block/flow diagram of a method for executing events and pre-fetching instructions in a single thread in accordance with the present embodiments.

Referring now to FIG. 4, a process flow is shown for embodiments without a helper thread. In such embodiments the main thread splits its time between waiting on polling responses and pre-fetching information. As above, block 402 collects registered events. In block 404, the main thread computes an interval for time multiplexing between polling and performing future walks. Block 404 divides a polling timeout into multiple equal partitions and defines units of work for the future path walk. In one partition, the thread polls for a fixed amount of time, then comes back and performs a pre-defined number of units of future path walks, and then returns to polling. This is repeated until the original polling timeout is met. Multiplexing ends either when all of the future path walks are completed or when the polling routine returns.

Block 406 then enters the loop with the polling timeout. Block 408 determines whether the poll has returned or whether a timeout of the polling according to the multiplexing plan has occurred. If the poll has returned, block 410 executes the callback for each event and block 412 performs synchronous activities. If there are more events to register at block 414, the new events are registered and processing returns to block 402. If not, processing ends.

If block 408 determines that a timeout has occurred, block 416 picks up the callback of the first event in the event loop and block 418 performs a future path walk on the code and/or data as described above. If block 420 determines that not all events have been processed, block 422 picks up the callback of the next event and returns processing to block 418. Otherwise processing returns to block 406 and the main thread enters the loop.

Embodiments without helper threads can be implemented in non-SMT systems. In addition, a separate thread and synchronization is not needed, leading to a more lightweight implementation. However, time multiplexing in a single thread does introduce some latency as a poll may return while the thread is performing its future path walks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 5:
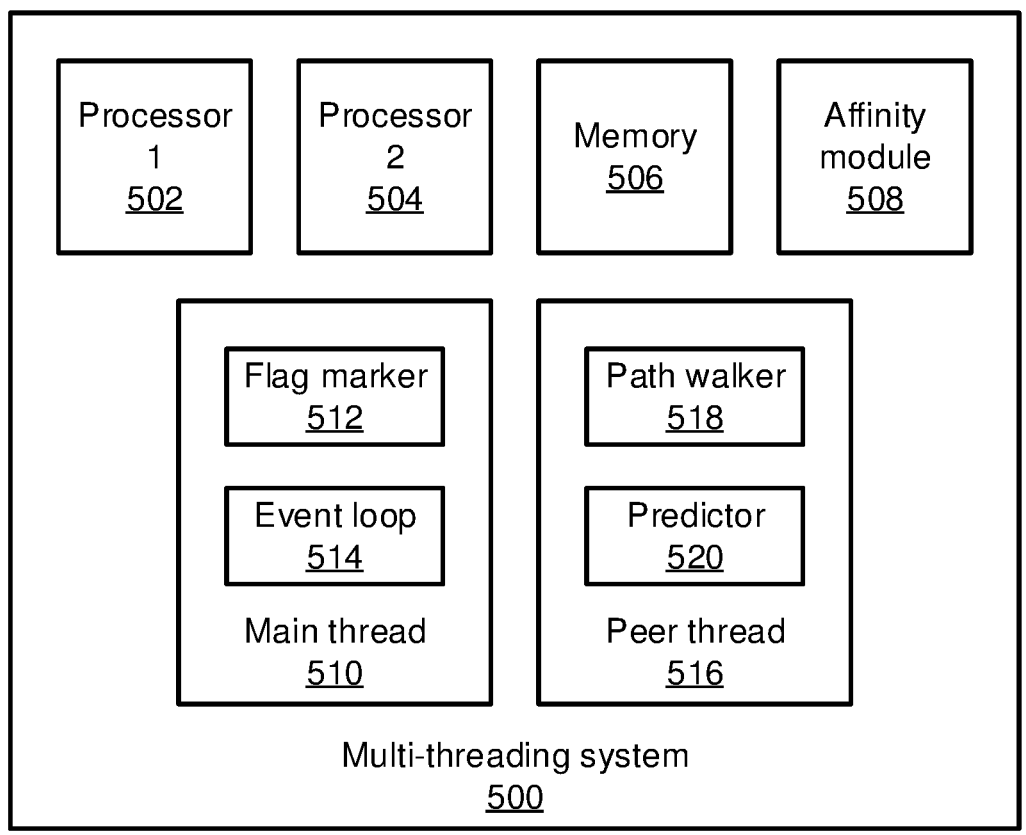
FIG. 5 is a block diagram of a multi-threading system in accordance with the present embodiments.

Referring now to FIG. 5, a multi-threading system 500 is shown. The multi-threading system 500 may include multiple processors, including a first hardware processor 502 and a second hardware processor 504. A memory stores data pertinent to the processes being executed by the processors 502/504 and an affinity module 508 determines and controls which processor a given thread is assigned to.

A main thread 510 is associated with a given software program and executes the instructions that the program dictates. Toward this end, the main thread 510 uses an event loop 514 that keeps track of various event handlers for the program, executing them in turn. The main thread 510 manages a flag marker 512 to provide information about its state, in particular providing information as to whether the main thread 510 is waiting for a polling request.

A peer thread 516 executes on the same processor as the main thread 510. This state is enforced by the affinity module 508, which either binds the two threads to the same hardware processor permanently or checks regularly whether the main thread 510 has moved. The peer thread 516 checks the flag marker 512 of the main thread 510 and implements a path walker 518 that pre-fetches the information needed by the events of the event loop 514. Optionally a predictor 520 determines a likelihood that a given event will be executed by the main thread 510 and controls the path walker 518 to limit pre-fetching to only those events that are most likely to execute.

It should be understood that the threads 510 and 516 are implemented as software that is stored in the memory 506 and is executed by one or more of the hardware processors 502/506. The multithreading system 500 also may include one or more functional modules that are, in one embodiment, implemented as software and executed by the processors. In an alternative embodiment, the functional modules may be implemented as one or more discrete hardware components, for example in the form of an application specific integrated chip, as logic implemented on the processor(s), or as field programmable gate arrays.

While it should be understood that the multithreading system 500 may be implemented for any appropriate software task, in one specific embodiment the multithreading system 500 implements server-side programming, for example as an HTTP server. In a server-side event loop, event descriptors are hard-bound with callbacks and the information as to which function will be invoked on an event is determined by referring to the data structure, which includes a mapping between the event and its callback. The present embodiments thus improve performance in proportion to the density and frequency of events, as the predictions of which events will execute improves. A server-side architecture is relatively static and event execution is therefore highly predictable, particularly as the workload increases.

Having described preferred embodiments of improving response times in asynchronous I/O-based software using thread pairing and co-execution (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for pre-fetching operations, comprising:
executing event callbacks in an event loop using a processor;
halting execution of the new event callbacks due to a polling request;
performing a path walk on future events in the event loop to pre-fetch information for the future events into a processor cache associated with the processor, the path walk including approximations, wherein the approximations include a different code flow path and a different set of objects than used by the main thread;
determining that the polling request has returned;
halting the path walk after determining that the polling request has returned; and
resuming execution of the event callbacks in the event loop after the polling request returns.

2. The method of claim 1, wherein executing event callbacks is performed in a main thread in a multi-threading system and said performing the path walk is performed in a peer thread in the multi-threading system.

3. The method of claim 2, further comprising attaching the peer thread to a same processor as the main thread.

4. The method of claim 2, further comprising reading a flag marker value of the main thread by the peer thread to determine when the main thread has stopped on the polling request.

5. The method of claim 1, wherein performing the path walk comprises retrieving an event handler routine for each event and executing all memory operations in all control flow paths for all calls associated with the event handler routine.

6. The method of claim 1, wherein performing the path walk comprises retrieving an event handler routine, a context object, and a receiver object, and accessing all fields in the all objects associated with the event handler routine.

7. The method of claim 1, wherein executing event callbacks and performing the path walk are performed by a single thread.

8. The method of claim 7, wherein the single thread time-multiplexes checking for a polling request return and performing the path walk.

9. The method of claim 1, further comprising determining a likelihood for future events to be executed and limiting the performance of the path walk to those future events that have a likelihood above a threshold.

10. The method of claim 1, further comprising limiting the performance of the path walk to events of a predetermined type.

11. A computer program product for pre-fetching operations, the computer program product comprising a computer readable storage medium having program instructions embodied therewith, the program instructions readable by a computer to cause the computer to:
execute event callbacks in an event loop using a processor;
halt execution of the event callbacks due to a polling request;
perform a path walk on future events in the event loop to pre-fetch information for the future events into a processor cache associated with the processor, the path walk including approximations, wherein the approximations include a different code flow path and a different set of objects than used by the main thread;
determine that the polling request has returned;
halt the path walk after determining that the polling request has returned; and
resume execution of the event callbacks in the event loop after the polling request returns.

12. A system for pre-fetching operations, comprising:
a processor cache;
a processor, associated with the processor cache, configured to:
execute event callbacks in an event loop until execution of new event callbacks stops due to a polling request,
perform a path walk on future events in the event loop to pre-fetch information for the future events into the processor cache, the path walk including approximations, wherein the approximations include a different code flow path and a different set of objects than used by the main thread,
determine that the polling request has returned,
halt the path walk after the polling request is determined to have returned, and
resume execution of the event callbacks in the event loop after the polling request returns.

13. The system of claim 12, wherein the processor is a multi-threading processor configured to execute event callbacks in a main thread and to perform the path walk in a peer thread.

14. The system of claim 13, wherein the processor is further configured to read a flag marker value of the main thread with the peer thread to determine when the main thread has stopped on the polling request.

15. The system of claim 12, wherein the processor is further configured to retrieve an event handler routine for each event and to execute all memory operations in all control flow paths for all calls associated with the event handler routine.

16. The system of claim 12, wherein the processor is further configured to retrieve an event handler routine, a context object, and a receiver object, and to access all fields in the all objects associated with the event handler routine.

17. The system of claim 12, wherein the processor is configured to execute event callbacks and to perform the path walk in a single thread.

18. The system of claim 17, wherein the single thread time-multiplexes checking for a polling request return and performing the path walk.

19. The system of claim 12, wherein the processor is further configured to determine a likelihood for future events to be executed and to limit the performance of the path walk to those future events that have a likelihood above a threshold.

20. The system of claim 12, wherein the processor is further configured to limit the performance of the path walk to events of a predetermined type.

* * * * *